(No Model.)
A. J. CHAPEL.
DRYING APPARATUS.
No. 465,343. Patented Dec. 15, 1891.
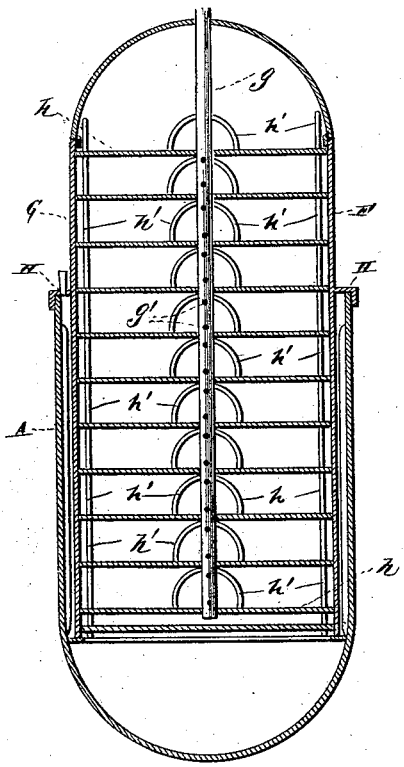
WITNESSES:
Chas. L. Payton
Philip E. Masi.
INVENTOR
Asa J. Chapel
BY E. W. Anderson
his ATTORNEY.

UNITED STATES PATENT OFFICE.

ASA J. CHAPEL, OF EUREKA SPRINGS, ARKANSAS.

DRYING APPARATUS.

SPECIFICATION forming part of Letters Patent No. 465,343, dated December 15, 1891.

Application filed April 22, 1891. Serial No. 389,943. (No model.)

*To all whom it may concern:*

Be it known that I, ASA JOHN CHAPEL, a citizen of the United States, and a resident of Eureka Springs, in the county of Carroll and State of Arkansas, have invented certain new and useful Improvements in Drying Apparatus; and I do declare the following to be a full, clear, and exact description of the invention, such as will enable others skilled in the art to which it appertains to make and use the same, reference being had to the accompanying drawing, and to letters of reference marked thereon, which form a part of this specification.

The figure shown in the drawing is a vertical section through the drying apparatus.

This invention has relation to certain new and useful improvements in drying apparatus; and it consists in the novel construction and arrangement of parts, as hereinafter described.

In the accompanying drawing, the letter A designates the boiler, which is preferably of galvanized iron, of suitable size, and provided with the cover A'. Around the inner surface of the side walls are several series of ribs or grooves $f$.

G represents the drier-frame, which consists of the casing F, adapted to fit down inside the boiler and having a central tube or spindle $g$. A series of shelves $h$ is supported in the casing and loosely fitted around the central tube. These shelves are preferably made of galvanized wire and are provided with handles $h'$, by means of which they may be removed or lowered into place in case it is not desired to remove the whole casing at once. The handles $h'$ on each shelf may be made to serve as supports for the superposed shelf, similar supports being provided at the sides. This casing has a surrounding horizontal flange H, which rests on the upper edge of the boiler and supports the said casing in position. The tube or spindle $g$ is provided with perforations $g'$ to allow the escape of steam from the fruit or other material which is undergoing the process of drying on the shelves.

It will be apparent that the steam arising from the lower portion of the boiler and passing up through the ribs or grooves at the sides and against the outer surface of the drier will heat the drier and its shelves sufficiently for the purpose. Said ribs serve to confine the steam between the boiler and the sides of the frame and prevent its too rapid escape. The tube G may be extended up through the upper portion of the frame at the top or out of the side to permit the escape of moisture. As the moisture and air at the bottom of the tube will be kept at a greater heat than that at the upper portion, it will be carried off and discharged at the mouth of said tube.

Having thus described my invention, what I claim as new, and desire to secure by Letters Patent, is—

The combination, with a boiler having a water-chamber at its lower portion and having its side walls provided with a series of vertical ribs, of the drier-case adapted to fit in said boiler and supported thereon by a surrounding flange, which also serves to close said boiler, a series of independent removable shelves supported in said casing and provided with handles, and a perforated escape-tube passing centrally and loosely through said shelves, substantially as specified.

In testimony whereof I affix my signature in presence of two witnesses.

ASA J. CHAPEL.

Witnesses:
   W. M. BROWN,
   R. B. RAY.